(12) United States Patent
Mellet et al.

(10) Patent No.: US 11,040,611 B2
(45) Date of Patent: Jun. 22, 2021

(54) TURBINE MOUNTED P2 FRONT WHEEL DRIVE TRANSMISSION ARRANGEMENT

(71) Applicant: GM Global Technology Operations LLC, Detroit, MI (US)

(72) Inventors: Edward W. Mellet, Rochester Hills, MI (US); James M. Hart, Belleville, MI (US); Elizabeth I. Wooden, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 31 days.

(21) Appl. No.: 16/552,652

(22) Filed: Aug. 27, 2019

(65) Prior Publication Data
US 2021/0061085 A1  Mar. 4, 2021

(51) Int. Cl.
| | | |
|---|---|---|
| *B60K 6/40* | (2007.10) | |
| *F16H 57/02* | (2012.01) | |
| *B60K 6/547* | (2007.10) | |
| *B60K 6/365* | (2007.10) | |
| *F16H 3/64* | (2006.01) | |

(52) U.S. Cl.
CPC ............... *B60K 6/40* (2013.01); *B60K 6/365* (2013.01); *B60K 6/547* (2013.01); *F16H 3/64* (2013.01); *F16H 57/02* (2013.01); *F16H 2057/02043* (2013.01); *F16H 2200/0052* (2013.01); *F16H 2200/201* (2013.01)

(58) Field of Classification Search
CPC .. B60K 6/40; B60K 6/405; B60K 2006/4808; B60K 2006/4816; F16H 57/02–039; F16H 2200/0052; F16H 2200/201
See application file for complete search history.

(56) References Cited

U.S. PATENT DOCUMENTS

| | | | | |
|---|---|---|---|---|
| 6,386,067 | B1* | 5/2002 | Inoue | F16H 45/02 |
| | | | | 74/730.1 |
| 8,561,775 | B2* | 10/2013 | Osawa | B60K 6/40 |
| | | | | 192/85.37 |
| 9,327,590 | B2* | 5/2016 | Ideshio | B60K 6/40 |
| 9,593,761 | B2* | 3/2017 | Frait | F16H 57/027 |
| 10,035,414 | B1* | 7/2018 | Hart | B60K 6/48 |
| 10,173,514 | B2* | 1/2019 | Wilton | F16H 7/06 |
| 10,634,219 | B2* | 4/2020 | Warth | B60K 6/547 |
| 10,843,557 | B2* | 11/2020 | Reimnitz | B60K 6/40 |
| 2004/0134735 | A1* | 7/2004 | Klement | F16D 67/02 |
| | | | | 192/3.32 |
| 2008/0099258 | A1* | 5/2008 | Berhan | B60K 6/405 |
| | | | | 180/65.22 |
| 2011/0086739 | A1* | 4/2011 | Kajigai | B60L 7/12 |
| | | | | 477/5 |

(Continued)

*Primary Examiner* — David R Morris

(57) ABSTRACT

A P2 transmission and engine assembly includes a transverse mounted transmission having: a transmission first end and a transmission second end oppositely positioned with respect to the transmission first end; and a transmission gearbox portion having a first cavity positioned at the second end. A torque converter is positioned at the transmission first end. An electric motor is positioned within the first cavity and is rotatably connected to the torque converter using a turbine shaft. A one-way clutch is connected to the turbine shaft and releasably connects the turbine shaft to the torque converter. The one-way clutch when disengaged disconnects the torque converter from the turbine shaft.

15 Claims, 2 Drawing Sheets

(56) References Cited

U.S. PATENT DOCUMENTS

| | | | |
|---|---|---|---|
| 2012/0193187 A1* | 8/2012 | Osawa | B60K 6/40 |
| | | | 192/85.17 |
| 2013/0193816 A1* | 8/2013 | Iwase | B60L 15/2054 |
| | | | 310/75 R |
| 2014/0123807 A1* | 5/2014 | Frait | F16H 57/027 |
| | | | 74/661 |
| 2015/0258885 A1* | 9/2015 | Ideshio | B60K 6/405 |
| | | | 180/65.225 |
| 2018/0118012 A1* | 5/2018 | Wilton | B60K 6/40 |
| 2018/0201117 A1* | 7/2018 | Hart | B60K 6/54 |
| 2018/0328466 A1* | 11/2018 | Warth | F16H 3/66 |
| 2019/0126746 A1* | 5/2019 | Reimnitz | F16D 25/082 |
| 2019/0226550 A1* | 7/2019 | Weber | B60K 6/48 |
| 2020/0039340 A1* | 2/2020 | Keller | B60K 6/26 |

\* cited by examiner

TURBINE MOUNTED P2 FRONT WHEEL DRIVE TRANSMISSION ARRANGEMENT

INTRODUCTION

The present disclosure relates to automobile vehicle drivetrains including engine-electric motor combined transmission assemblies, known as P2 hybrid transmissions.

Hybrid automobile motor vehicles which according to the present disclosure include cars, sport utility vehicles, vans, light duty trucks including pickup trucks and the like commonly provide a gasoline or diesel powered engine coupled to a transmission, with an electric motor connected to and powered by a battery source providing an alternate drive means for the automobile vehicle. The electric motor is operated when battery power is available to improve operating economy, and the engine is operated when maximum power is necessary such as during high velocity highway vehicle operation and when battery power to operate the electric motor is insufficient.

The various powertrain architectures for connecting an electric motor in hybrid electric vehicles includes P0, P1, P2, P3 and P4 designs. P0 architecture connects the electric motor with an internal combustion engine through a belt on a front-end accessory drive. P1 architecture has the electric motor connected directly with a crankshaft of the engine. P2 architecture provides the electric motor either side-attached using a belt or integrated between the engine and the transmission with the electric motor decoupled from the engine. P3 architecture has the electric motor attached through a gear mesh to the transmission, with a speed of the electric motor a multiple of a wheel speed. P4 architecture has the electric motor mounted connected through a gear mesh on a rear axle drive or a wheel hub. There is an advantage to using a torque converter with an automatic transmission including P2 hybrid transmissions to improve vehicle launch and shifting. Torque converters may typically add 100+ mm to a length of the transmission assembly which thereby introduces packaging limitations within the engine compartment of the automobile vehicle.

Due to these packaging constraints within the engine compartment, the electric motor of known P2 hybrid transmissions is positioned within a bell housing which is commonly located between the engine and the transmission. This location of the electric motor lengthens the overall engine-to-transmission assembly and commonly requires elimination of the torque converter to suit arrangement constraints. The torque converter is replaced by a slip clutch to enable vehicle launch. Known P2 hybrid transmission and engine assemblies used in front wheel drive (FWD) vehicles with a slip clutch may suffer from rough gear shifts compared to a drivetrain having a torque converter.

Thus, while current P2 hybrid transmission and engine assemblies achieve their intended purpose, there is a need for a new and improved P2 hybrid transmission and engine assembly which includes a torque converter and an electric motor.

SUMMARY

According to several aspects, a P2 transmission and engine assembly includes a transmission having a transmission first end and a transmission second end oppositely positioned with respect to the transmission first end. A torque converter is positioned at the transmission first end. A transmission gearbox portion includes the transmission first end and the transmission second end. The transmission gearbox portion includes a first cavity. An electric motor is positioned within the first cavity and is rotatably connected to the torque converter.

In another aspect of the present disclosure, the transmission is transverse mounted and the first cavity is positioned at the transmission second end thereby positioning the electric motor at the transmission second end and oppositely positioned about the transmission with respect to the torque converter.

In another aspect of the present disclosure, a turbine shaft is connected to the electric motor and to the torque converter.

In another aspect of the present disclosure, a connecting member is positioned within the transmission gearbox portion and is connected to the turbine shaft.

In another aspect of the present disclosure, a first clutch assembly is supported by the connecting member and a second clutch assembly is supported by the connecting member.

In another aspect of the present disclosure, the first clutch assembly and the second clutch assembly are positioned within a second cavity of the transmission gearbox portion.

In another aspect of the present disclosure, a first stationary piston actuates the first clutch assembly using a first apply-through bearing; and a second stationary piston actuates the second clutch assembly using a second apply-through bearing.

In another aspect of the present disclosure, a one-way clutch connected to the turbine shaft.

In another aspect of the present disclosure, a combustion engine is mounted to the transmission first end and is rotatably connected to the torque converter.

In another aspect of the present disclosure, the one-way clutch releasably connects the turbine shaft to the torque converter. The one-way clutch when disengaged disconnects the torque converter from the turbine shaft allowing the electric motor to be operated without wind-milling the combustion engine.

According to several aspects, a P2 transmission and engine assembly includes a transverse mounted transmission having: a transmission first end and a transmission second end oppositely positioned with respect to the transmission first end; and a transmission gearbox portion having a first cavity positioned at the second end. A torque converter is positioned at the transmission first end. An electric motor is positioned within the first cavity and is rotatably connected to the torque converter using a turbine shaft. A one-way clutch is connected to the turbine shaft and releasably connects the turbine shaft to the torque converter. The one-way clutch when disengaged disconnects the torque converter from the turbine shaft.

In another aspect of the present disclosure, the transmission gearbox portion includes the transmission first end, the transmission second end, the first cavity and a gear set having multiple planetary gear sets.

In another aspect of the present disclosure, the gear set defines a six speed gear set.

In another aspect of the present disclosure, the transmission gearbox portion includes a second cavity having a first clutch assembly and a second clutch assembly positioned within the second cavity.

In another aspect of the present disclosure, a first stationary piston supported at the transmission second end and actuating the first clutch assembly.

In another aspect of the present disclosure, a second stationary piston supported at the transmission second end and actuating the second clutch assembly.

In another aspect of the present disclosure, a first apply-through bearing is applied by the first stationary piston to actuate the first clutch assembly; and a second apply-through bearing is applied by the second stationary piston to actuate the second clutch assembly.

According to several aspects, a P2 transmission and engine assembly includes a transverse mounted transmission having: a transmission first end and a transmission second end oppositely positioned with respect to the transmission first end; a transmission gearbox portion having a first cavity positioned at the second end; and a gear set having multiple planetary gears defining a six speed gear set. A torque converter is positioned at the transmission first end. An electric motor is positioned within the first cavity. A turbine shaft connects the electric motor to the torque converter, and the gear set is connected to the turbine shaft. A combustion engine is connected to the transmission first end and is rotatably connected to the torque converter. A one-way clutch is connected to the turbine shaft and releasably connects the turbine shaft to the torque converter. The one-way clutch when disengaged disconnects the torque converter from the turbine shaft allowing the electric motor to be operated without wind-milling the combustion engine.

In another aspect of the present disclosure, the transmission gearbox portion includes a second cavity having at least one clutch assembly positioned within the second cavity releasably coupling the electric motor to the turbine shaft.

In another aspect of the present disclosure, a connecting member is positioned within the transmission gearbox portion and supports the electric motor for rotation with respect to the turbine shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
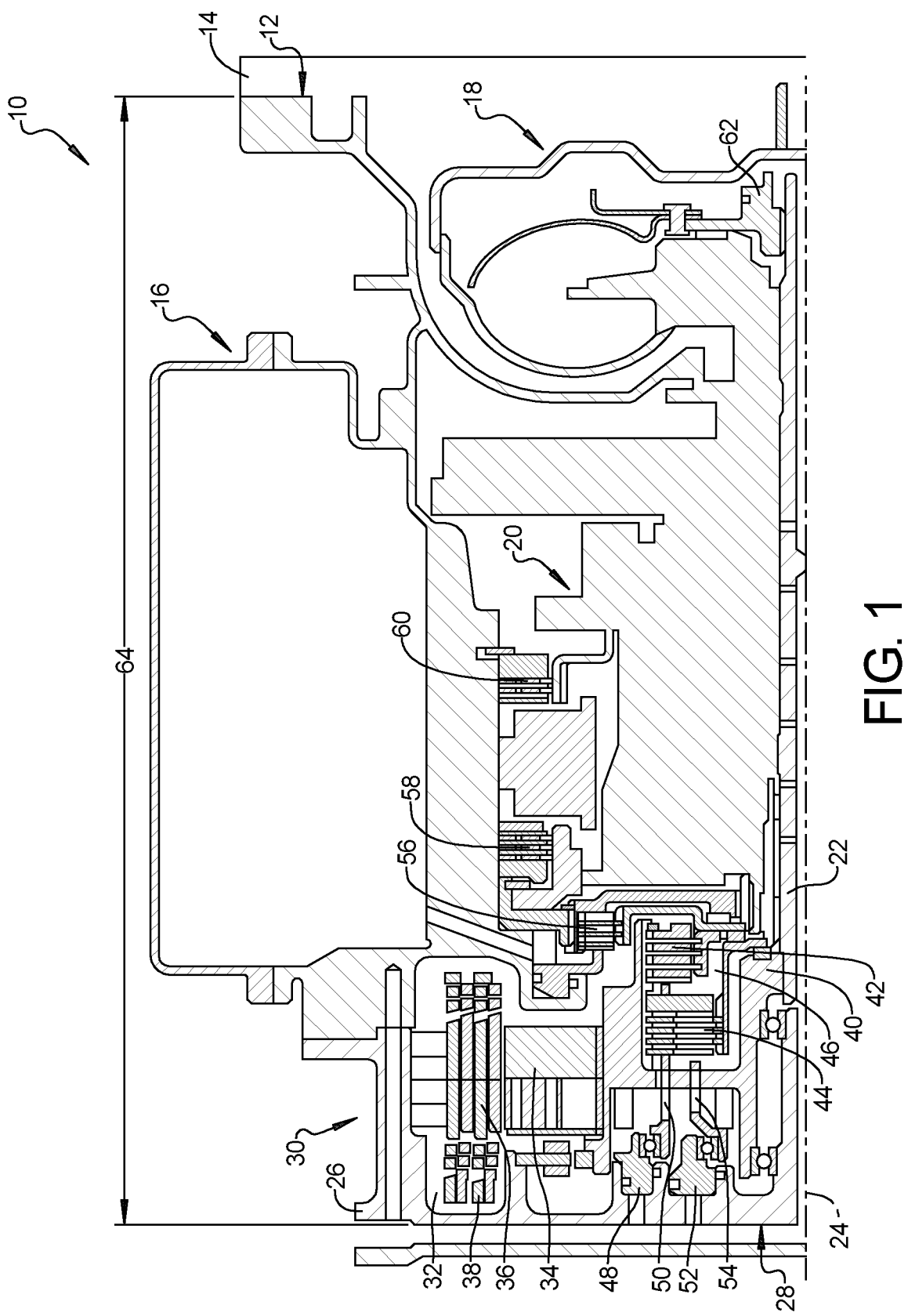
FIG. 1 is a cross sectional elevational view of a portion of a P2 transmission and engine assembly according to an exemplary aspect.

Referring to FIG. 1, a front wheel drive (FWD) transverse-mounted P2 transmission and engine assembly 10 for an automobile vehicle includes an engine mounting or transmission first end 12 to which a combustion engine 14 (shown generically) such as a gasoline engine or diesel engine is connected. Transverse-mounted as defined herein provides an alignment of the engine 14 and a transmission 16 having a centerline oriented transverse to an alignment of the front wheels of an automobile vehicle. The P2 transmission and engine assembly 10 also includes a torque converter 18 positioned at the first end 12 of the transmission 16. The torque converter 18 provides a hydraulic rotating drive connection for transferring power from the engine 14 to a gear set 20. The gear set 20 which in the example shown includes three planetary gear sets has sun gears, ring gears, planet gears and planet gear carriers for each of the planetary gear sets as are known. In the non-limiting example shown the gear set 20 defines a six-speed gear set which together with the torque converter 18 are connected to and are rotated by a turbine shaft 22. Other multiple speed gear sets can also be provided within the scope of the present disclosure. The turbine shaft 22 rotates with respect to a shaft axis of rotation 24 which in the FWD configuration is mounted transverse to a center axis of an automobile vehicle.

A transmission gearbox portion 26 includes a transmission second end 28 which is oppositely positioned with respect to the transmission first end 12. The transmission gearbox portion 26 also includes an electric motor 30 positioned within a first cavity 32 of the transmission gearbox portion 26 positioned at the transmission second end 28. The electric motor 30 positioned at the transmission second end 28 is therefore oppositely positioned with respect to the torque converter 18 which is positioned at the transmission first end 12. The electric motor 30 includes a rotor 34 and a stator 36 having multiple winding end turns 38 positioned about a perimeter of the stator 36. The electric motor 30 when energized rotates a connecting member 40 which is connected such as by a spline gear to the turbine shaft 22, with the connecting member 40 rotating within the transmission gearbox portion 26 with respect to the shaft axis of rotation 24.

A first clutch assembly 42 and a second clutch assembly 44 are positioned in a second cavity 46 of the transmission gearbox portion 26. The first clutch assembly 42 is actuated via a first stationary piston 48 using a first apply-through bearing 50. The first stationary piston 48 is supported at the transmission second end 28. The second clutch assembly 44 is actuated via a second stationary piston 52 using a second apply-through bearing 54. The second stationary piston 52 is also supported at the transmission second end 28. The use of stationary pistons with apply-through bearings eliminates rotating clutches which thereby reduces hydraulic demand for transmission operation. A third clutch assembly 56 is also provided within the transmission gearbox portion 26. A fourth clutch assembly 58 and a fifth clutch assembly 60 may also be provided for engagement of various ones of the members of the gear set 20.

A one-way-clutch 62 is provided to permit mechanical disconnection of the engine 14 from the transmission 16, which therefore allows operation using only the electric motor 30. According to several aspects the one-way clutch 62 is provided within a housing or body of the torque converter 18. The one-way-clutch 62 is connected such as using a splined connection to the turbine shaft 22 and permits disconnection of the torque converter 18 from the turbine shaft 22. When the one-way-clutch 62 is disengaged the torque converter 18 is disconnected from the turbine shaft 22, allowing the electric motor 30 to be operated without wind-milling the engine 14. By incorporating the electric motor 30 within the transmission gearbox portion 26, the P2 transmission and engine assembly 10 provides an overall length 64 between the transmission first end 12 and the transmission second end 28 which is increased by less than 25 mm compared to conventional variants of P2 transmission and engine assemblies which position the electric motor within a bell housing and omit the torque converter 18.

Figure 2:
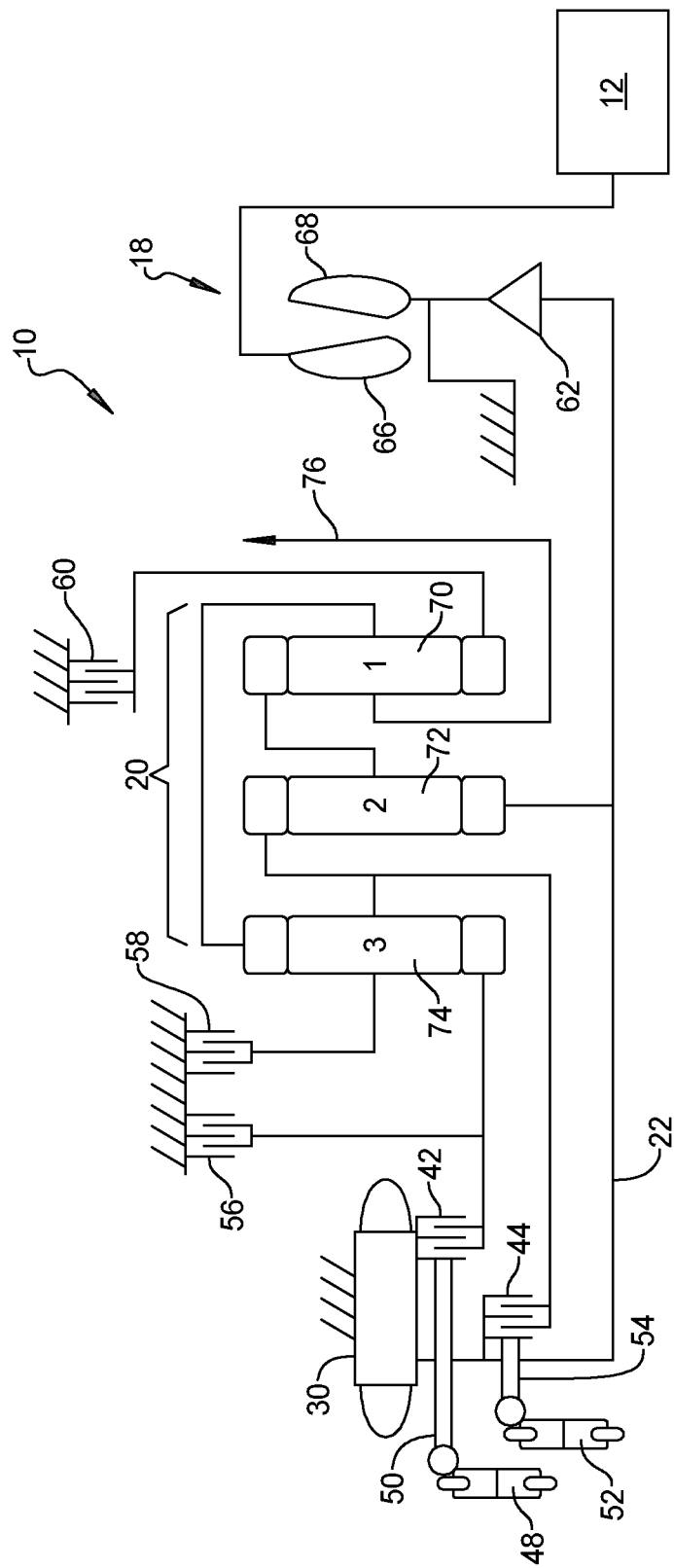
FIG. 2 is a modified lever diagram of a six-speed transmission defined by the P2 transmission and engine assembly of FIG. 1.

Referring to FIG. 2 and again to FIG. 1, according to several aspects, the engine 14 is connected to a stator 66 of the torque converter 18 and the turbine shaft 22 is connected to a turbine 68 of the torque converter 18. According to several aspects, the gear set 20 includes a first planetary gear set 70, a second planetary gear set 72 and a third planetary gear set 74. A transmission output 76 is interconnected to the first planetary gear set 70.

The arrangement of the P2 transmission and engine assembly 10 provides minimum volume for the first cavity 32 to contain the electric motor 30 to optimize packaging. The P2 transmission and engine assembly 10 provides the first and second clutch assemblies 42, 44 within the space envelope of the structure supporting the electric motor 30 which are connected to the first and second stationary pistons 48, 52, and are provided with the first and second apply-through bearings 50, 54 to reduce frictional losses while enabling an improved packaging size. The electric motor 30 defines a turbine-mounted electric motor which is directly connected to the output 76 through the first and second clutch assemblies 42, 44 which is distinguished from a traditional front-mounted P2 engine and transmission assembly that requires an additional disconnect clutch.

A P2 transmission and engine assembly 10 of the present disclosure offers several advantages. These include provision of a P2 FWD transmission arrangement and electric motor 30 location which provides packaging advantages versus a traditional electric motor location within a bell housing. The electric motor 30 position in a first cavity 32 at the transmission second end 28 of the transmission 16 coupled with changes from rotating clutches to grounded first and second clutch assemblies 42, 44 with the first and second apply-through bearings 50, 54 results in no rotating clutches within the transmission 16. The present arrangement provides packaging advantages and enables an engine to transmission disconnect through the one-way-clutch 62 positioned in the torque converter 18.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A P2 transmission and engine assembly, comprising:
   a transmission having a transmission first end and a transmission second end oppositely positioned with respect to the transmission first end;
   a torque converter positioned at the transmission first end;
   a transmission gearbox portion including the transmission first end and the transmission second end, the transmission gearbox portion having a first cavity;
   an electric motor positioned within the first cavity and rotatably connected to the torque converter, with the transmission transverse mounted and the first cavity being positioned at the transmission second end thereby positioning the electric motor at the transmission second end and oppositely positioned with respect to the torque converter;
   a turbine shaft connected to the electric motor and to the torque converter;
   a connecting member positioned within the transmission gearbox portion and connected to the turbine shaft; and
   a first clutch assembly supported by the connecting member and a second clutch assembly supported by the connecting member.

2. The P2 transmission and engine assembly of claim 1, wherein the first clutch assembly and the second clutch assembly are positioned within a second cavity of the transmission gearbox portion.

3. The P2 transmission and engine assembly of claim 1, further including:
   a first stationary piston actuating the first clutch assembly using a first apply-through bearing; and
   a second stationary piston actuating the second clutch assembly using a second apply-through bearing.

4. The P2 transmission and engine assembly of claim 1, further including a one-way clutch connected to the turbine shaft.

5. The P2 transmission and engine assembly of claim 4, further including a combustion engine mounted to the transmission first end and rotatably connected to the torque converter.

6. The P2 transmission and engine assembly of claim 4, wherein the one-way clutch releasably connects the turbine shaft to the torque converter, the one-way clutch when disengaged disconnects the torque converter from the turbine shaft allowing the electric motor to be operated without wind-milling the combustion engine.

7. A P2 transmission and engine assembly, comprising:
   a transverse mounted transmission having:
      a transmission first end and a transmission second end oppositely positioned with respect to the transmission first end; and
      a transmission gearbox portion having a first cavity positioned at the transmission second end;
   a torque converter positioned at the transmission first end;
   an electric motor positioned within the first cavity and rotatably connected to the torque converter using a turbine shaft;
   a one-way clutch connected to the turbine shaft and releasably connecting the turbine shaft to the torque converter, the one-way clutch when disengaged disconnecting the torque converter from the turbine shaft,
   a first clutch assembly and a second clutch assembly;
   a first stationary piston actuating the first clutch assembly;
   a second stationary piston actuating the second clutch assembly;
   a first apply-through bearing applied by the first stationary piston to actuate the first clutch assembly; and
   a second apply-through bearing applied by the second stationary piston to actuate the second clutch assembly.

8. The P2 transmission and engine assembly of claim 7, wherein the transmission gearbox portion includes the transmission first end, the transmission second end, the first cavity and a gear set having multiple planetary gear sets.

9. The P2 transmission and engine assembly of claim 8, wherein the gear set defines a six speed gear set.

10. The P2 transmission and engine assembly of claim 7, wherein the transmission gearbox portion includes a second cavity having the first clutch assembly and the second clutch assembly positioned within the second cavity.

11. The P2 transmission and engine assembly of claim 10, with the first stationary piston supported at the transmission second end and actuating the first clutch assembly.

12. The P2 transmission and engine assembly of claim 11, with the second stationary piston supported at the transmission second end and actuating the second clutch assembly.

13. A P2 transmission and engine assembly, comprising:
   a transverse mounted transmission having:
      a transmission first end and a transmission second end oppositely positioned with respect to the transmission first end;
      a transmission gearbox portion having a first cavity positioned at the transmission second end; and
      a gear set having multiple planetary gears defining a six-speed gear set;

a torque converter positioned at the transmission first end;
an electric motor positioned within the first cavity;
a turbine shaft connecting the electric motor to the torque converter, and having the gear set connected to the turbine shaft;
a combustion engine connected to the transmission first end and rotatably connected to the torque converter; and
a one-way clutch connected to the turbine shaft and releasably connecting the turbine shaft to the torque converter, the one-way clutch when disengaged disconnecting the torque converter from the turbine shaft allowing the electric motor to be operated without wind-milling the combustion engine.

14. The P2 transmission and engine assembly of claim 13, wherein the transmission gearbox portion includes a second cavity having at least one clutch assembly positioned within the second cavity releasably coupling the electric motor to the turbine shaft.

15. The P2 transmission and engine assembly of claim 13, further including a connecting member positioned within the transmission gearbox portion and supporting the electric motor for rotation with respect to the turbine shaft.

\* \* \* \* \*